United States Patent [19]
Riekeles

[11] 3,980,442
[45] Sept. 14, 1976

[54] PROCESS FOR USING A COMBINATION TOOL

[75] Inventor: Harald Arno Wilhelm Riekeles, Dietzenbach, Germany

[73] Assignee: Amtel, Inc., Providence, R.I.

[22] Filed: Apr. 4, 1975

[21] Appl. No.: 564,865

[52] U.S. Cl. .................................. 29/90 R; 29/567
[51] Int. Cl.² ...................................... B24B 39/00
[58] Field of Search ............... 29/90, 567; 408/200

[56] References Cited
UNITED STATES PATENTS

| | | | |
|---|---|---|---|
| 2,923,181 | 2/1960 | Grage | 29/90 |
| 3,242,567 | 3/1966 | Adam et al. | 29/567 |
| 3,795,957 | 3/1974 | Steusloff | 29/567 |

Primary Examiner—Leonidas Vlachos
Attorney, Agent, or Firm—Barlow & Barlow

[57] ABSTRACT

A method of using combination tool is disclosed in which a roller burnishing tool and a cutting tool are both mounted on a common shaft means and in which the roller burnishing tool has its mandrel arranged so that its largest diameter portion is located toward the forward end of the tool in the direction of normal advance and protruding from the larger diameter end porton of the mandrel is a nose or male portion that is adapted to engage a receiving socket means in cutting tool assembly that is co-axially arranged with the roller burnishing tool and in which cutting is accomplished on the forward pass and burnishing on withdrawal from a bore.

2 Claims, 1 Drawing Figure

U.S. Patent  Sept. 14, 1976  3,980,442
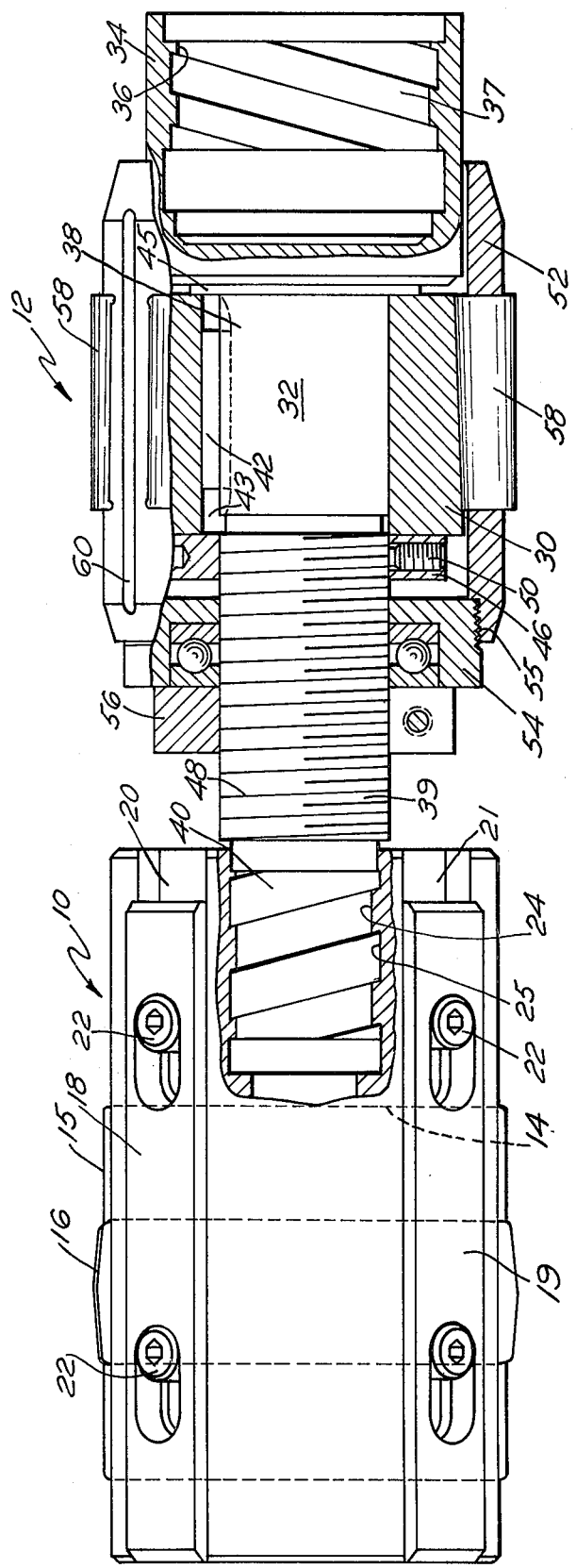

PROCESS FOR USING A COMBINATION TOOL

BACKGROUND OF THE INVENTION

It has been proposed in the past to utilize combination tools consisting of roller burnishing tools and cutting tools which, in effect, were affixed to a common shaft driving means. The arrangement of these tools has been such that the cutting tool is on the leading or tip end of the shaft and is then divided from the roller burnishing tool by a baffle plate or the like, which baffle plate would serve to keep the chips away from the roller burnishing operation and then the roller burnishing tool followed up by burnishing the cut bore in a single pass. In order to make the operation successful, it was further necessary to have a substantial flow of cutting oil forced into the bore which also would help to entrain the shavings and force them out the free end of the bore. This type of operation leaves much to be desired if a quality finish of the surface of the bore is to be attained. The reason behind this is that the feed rate and the rotational speed for each tool is not optimum for each tool involved. For example, the optimum feed rate and rotational speed for a boring tool is very different from that of a roller burnishing tool. Accordingly, in order to operate a device in this fashion the user of the tool will have to compromise between the two desired values. In addition, the cutting operation creates substantial vibrations in the shaft and this vibration seriously affects the operation of a roller burnishing tool, since the shaft upon which both tools are mounted, chatters. As a result of these considerable difficulties in producing a proper surface, the operations have been carried on individually on a turret or like arrangement with a boring tool mounted in one position and the roller burnishing tool in another position. It is obvious that this is not a desirable arrangement as it requires four passes, two each in and out, for machining and smoothing a single bore.

SUMMARY OF THE INVENTION

This invention relates to an arrangement and method of using of a combination tool which has a cutting tool at the front end thereof and a roller burnishing tool rearwardly thereof for both cutting and roller burnishing a bore. The roller burnishing tool has a cage which preferably has conical rollers held obliquely to the tool axis and mounted to be rotatable about a mandrel which, in effect, is part of the main tool shaft. The mandrel is shaped to be frusto-conical in the opposite sense to the rollers with the largest diameter of the frusto-conical portion facing forwardly toward the cutting tool, whereby as the tool enters a bore, the cage with the rollers held therein will automatically remain out of engagement with the surface of the hole to be processed, since the cage, due to the forward action of the tool in the bore, will displace itself in the direction of the smallest diameter of the frusto-conically shaped mandrel. In addition, the cage of the roller burnishing tool is provided with a plurality of axially extending grooves therein so as to facilitate the passage of hydraulic fluid thereby. The forward end of the mandrel of the roller burnishing tool is provided with a nose portion or a male shaft portion that protrudes therefrom and has means affixed thereto such as screw threads or other fastening means to engage into a socket or other type of fastening recess of a cutting tool. The skiving tool is a cylindrical body with at least a diametrical slot cut therein into which slot is received a boring cutter. Certain other refinements can be made to the cutting tool such as the addition of wear pads to the surface thereof which can enable the tool body to be properly oriented within the bore.

The main object that can be attained by utilization of the instant invention relates to the fact that the two tools may be mounted on a single shaft and during the forward motion the cutting action takes place and then on the withdrawal motion the roller burnishing action takes place, thus eliminating the deleterious chattering or vibration mentioned above in the Background paragraph. The invention therefore solves the problem of properly machining and roller burnishing a bore with a high surface quality by roller burnishing after conclusion of the cutting procedure in the return run.

DESCRIPTION OF THE DRAWINGS

The single FIGURE is an elevational view partly in section of a combination tool made in accordance with the invention.

DESCRIPTION OF THE PREFERRED EMBODIMENT

With reference to the drawing there is illustrated a cutting tool generally designated 10 that is arranged to be drivingly secured to a roller burnishing tool generally designated 12. The cutting tool can take a variety of forms but generally includes at least a transverse slot 14 into which the cutting tool 15 slidably fits together with its cutting edge tool part 16. The cutting tool body may be provided with a plurality of wear pads 18, 19 which are secured to the periphery thereof as, for example, in grooves 20 and 21 and fastened therein by socket head screws such as 22. The tool body is also provided with an axial recess 24 which in the present illustration is shown as having square threads 25 therein. The roller burnishing tool 12 comprises a mandrel 30 which is made fast with a mandrel shaft 32, since from a practical standpoint it is preferable to make the parts in more than one piece. Thus the mandrel shaft 32 portion comprises a rearward section 34 having a driving socket 36 with threads 37, a central portion 38 and a front nose portion 39 which has at the end thereof a threaded section with threads 40 which are adapted to engage the threads 25 of the socket 24 that is located in the skiving tool body. As will be seen by referring to the drawing, the central section 38 of the mandrel shaft is provided with at least a key 42 which engages the corresponding key slot 43 in the mandrel body 30 which is made as a sleeve to fit over the central section of the mandrel shaft 32 and slide up against a rearward abutment at 45 and be held thereagainst by a fastening ring 46 which ring is threadingly received on the threads 48 of the section 39 of the mandrel shaft and thus may be readily made fast thereto by screwing the same up tight against the mandrel body 30 and locking the same in place with a lock screw such as the screw 50 that acts against a resilient pad so as not to damage the threads, a technique which is well known to those skilled in the art. About the mandrel 30 is received a cage 52, the cage holder being supported in position by an axial bearing 54 to which the same is secured as by a screw-threaded joint 55 and which may be set for diameter by varying the position of a setting ring 56 which is threaded onto the shaft section 39. The cage 52 is provided with a plurality of frusto-conical rollers 58 and on the surface of the cage are provided a plurality of axially extending grooves 60.

By virtue of the multiple part construction of the combination tool, the roller burnishing tool and the cutting tool may be readily removed one from the other for replacement and/or repair and further the arrangement is such that the main body drive shaft may be screw threaded or otherwise releasably connected into the roller burnishing tool body. This enables one to exchange like parts for parts of different sizes when needed. During the processing of a cylindrical bore, oil will flow from the roller burnishing end of the tool to the left as viewed in the drawing and the provision of the grooves 60 will enhance the flow of oil toward the cutting tool head. During normal processing, with the tool moving to the left as viewed in the drawing, the roller burnishing tool will become ineffective since any contact of the rollers 58 with the surface of the cylindrical bore will cause an axial displacement of the cage to the right as viewed in the drawing which will move the rollers to a lesser diameter of the mandrel 30. During the boring operation oil will be fed to the cutter head with sufficient force to flush the chips out the forward end of the bore and will not displace the cage by virtue of the grooves 60. After the machining has been completed, the boring tool 15 with its cutter blade 16 may be readily slid out of its pocket or slot and on the reverse run or when the tool is moving to the right as viewed in the drawing, the roller burnishing action will now become effective since the force of the oil urges the cage toward the larger diameter of the mandrel 30. Contact of the rollers 58 with the interior surface of the bore being processed causes the rollers to move further to the left as viewed in the drawing in the direction of the larger diameter of the mandrel as well known to those skilled in the burnishing art.

I claim:

1. A method of skiving and roller burnishing a bore comprising furnishing a roller burnishing tool with a protruding mandrel shaft and a main mandrel section tapered with the largest diameter being adjacent the protruding shaft together with conical rollers disposed in operative relationship thereon, fastening a skiving tool assembly having a cutter on to the protruding mandrel shaft, conducting a current of fluid into the bore while advancing the tool into the bore, feeding the tool out of the bore and withdrawing the tool thru the bore to roller burnish the bore on the withdrawal stroke, the current of fluid urging the rollers toward the larger diameter of the mandrel.

2. A method as in claim 1 wherein the cutter is removed from the skiving tool before withdrawing the tool into the bore.

* * * * *